United States Patent
Niikawa et al.

(10) Patent No.: US 7,161,618 B1
(45) Date of Patent: Jan. 9, 2007

(54) CAMERA SYSTEM INCLUDING CAMERA AND COMPUTER HAVING INTER-DEVICE CONTROL CAPABILITY AND CAMERA THEREOF

(75) Inventors: Masahito Niikawa, Sakai (JP); Kenji Nakamura, Takatsuki (JP); Izumi Hayakawa, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/270,834

(22) Filed: Mar. 18, 1999

(30) Foreign Application Priority Data

Mar. 18, 1998 (JP) ................................. 10-068975

(51) Int. Cl.
*H04N 5/225* (2006.01)
(52) U.S. Cl. ................................. 348/207.1; 348/333.04
(58) Field of Classification Search .......... 348/207.99, 348/207.1, 207.11, 211.99, 211.4–211.9, 348/222.1, 231.99, 231.3, 231.6, 231.7, 333.01, 348/333.02, 333.04, 333.05, 333.11, 333.12, 348/333.13, 552
See application file for complete search history.

(56) References Cited

U.S. PATENT DOCUMENTS

| | | | |
|---|---|---|---|
| 4,992,866 A | | 2/1991 | Morgan |
| 5,402,170 A | * | 3/1995 | Parulski et al. .......... 348/211.6 |
| 5,473,366 A | * | 12/1995 | Imaeda et al. ........... 348/14.01 |
| 5,581,299 A | | 12/1996 | Raney .......................... 348/64 |
| 5,584,035 A | * | 12/1996 | Duggan et al. ............. 345/619 |
| 5,633,678 A | * | 5/1997 | Parulski .................... 348/231.5 |
| 5,999,708 A | | 12/1999 | Kajita ......................... 358/1.15 |
| 6,111,662 A | | 8/2000 | Satoh ........................ 358/442 |
| 6,151,652 A | * | 11/2000 | Kondo et al. .......... 348/231.99 |
| 6,191,807 B1 | * | 2/2001 | Hamada ................. 348/14.07 |
| 6,201,571 B1 | * | 3/2001 | Ota .......................... 348/231.3 |
| 6,226,449 B1 | * | 5/2001 | Inoue ....................... 348/231.5 |
| 6,256,059 B1 | * | 7/2001 | Fichtner ................... 348/222.1 |
| 6,313,877 B1 | * | 11/2001 | Anderson .............. 348/333.05 |
| 6,507,363 B1 | * | 1/2003 | Anderson ................ 348/231.9 |
| 6,668,134 B1 | * | 12/2003 | Niikawa ................. 348/231.1 |
| 6,690,415 B1 | * | 2/2004 | Mamiya .................. 348/207.1 |
| 6,784,925 B1 | * | 8/2004 | Tomat et al. .......... 348/333.05 |
| 6,819,355 B1 | * | 11/2004 | Niikawa ................. 348/207.11 |
| 7,099,559 B1 | * | 8/2006 | Niikawa et al. ............... 386/94 |
| 2001/0015758 A1 | * | 8/2001 | Fichtner ..................... 348/211 |
| 2001/0019359 A1 | * | 9/2001 | Parulski et al. ............. 348/207 |
| 2002/0018114 A1 | * | 2/2002 | Shibata et al. ........... 348/14.07 |

(Continued)

FOREIGN PATENT DOCUMENTS

EP 860978 8/1998

(Continued)

OTHER PUBLICATIONS

Eastman Kodak Company. "Kodak Digital Science DC120 Zoom Digital Camera User's Guide", 1997.*

(Continued)

*Primary Examiner*—Vivek Srivastava
*Assistant Examiner*—Jason Whipkey
(74) *Attorney, Agent, or Firm*—Buchanan Ingersoll & Rooney PC

(57) ABSTRACT

A camera system includes a camera for photographing an object and acquiring image data of the object, and a computer connectable to the camera. The camera is provided with a manipulation member and a camera controller for detecting an operation of the manipulation member and transmitting a signal based on the detected results to the computer. The computer is provided with a controller for controlling a screen of a display functioning together with the computer based on the signal received from the camera.

22 Claims, 13 Drawing Sheets

DISPLAY AREA CHANGE IN ACCORDANCE WITH DISPLAY MAGNIFICATION RATES CHANGE AT DIGITAL CAMERA (D11)

U.S. PATENT DOCUMENTS

| | | | |
|---|---|---|---|
| 2002/0033888 A1* | 3/2002 | Yamagami | 348/232 |
| 2003/0011683 A1* | 1/2003 | Yamasaki et al. | 348/207.1 |
| 2003/0142215 A1* | 7/2003 | Ward et al. | 348/231.3 |
| 2005/0078189 A1* | 4/2005 | Creamer et al. | 348/207.1 |

FOREIGN PATENT DOCUMENTS

| | | |
|---|---|---|
| EP | 889635 | 1/1999 |
| JP | 07044477 | 2/1995 |
| JP | 07-225687 A | 8/1995 |
| JP | 09163209 | 6/1997 |
| JP | 09270944 | 10/1997 |
| JP | 09289631 | 11/1997 |
| JP | 09326799 | 12/1997 |

OTHER PUBLICATIONS

Eastman Kodak Company. "History of Kodak", http://www.kodak.com/global/en/corp/historyOfKodak/1990.jhtml?pq-path=2703.*

Eastman Kodak Company, "User's Manual: EOS DCS 1", 1997, p. 8-59.*

* cited by examiner

DISPLAY AREA CHANGE IN ACCORDANCE WITH DISPLAY
MAGNIFICATION RATES CHANGE AT DIGITAL CAMERA (D11)

50% DISPLAY AT DIGITAL CAMERA (D20)

DISPLAY AREA CHANGE IN ACCORDANCE WITH DISPLAY
MAGNIFICATION RATES CHANGE AT DIGITAL CAMERA (D21)

WARNING SCREEN AT PC (D40)

WARNING SCREEN AT DIGITAL CAMERA (D40)

REGISTRATION OF ACTION TO FUNCTION KEY (D50)

```
▓▓▓▓ REGISTRATION CHANGE OF F1 KEY ▓▓▓▓

TRANSFER DATA

SPECIFY FOLDER TO WHICH DATA ARE TRANSFERRED

CHANGE SCREEN DISPLAY MAGNIFICATION

TURN OFF POWER SOURCE OF PC

DISPLAY IMAGE DATA IN PC

EXECUTE APPLICATION IN PC

TRANSFER IMAGE TO PC IMMEDIATELY AFTER
PHOTOGRAPHING
─────────────────────────────────────────
PRESS UP KEY/DOWN KEY TO SELECT CONTENT OF
REGISTRATION AND PRESS SHUTTER BUTTON TO EFFECT
```

FIG.15

CAMERA SYSTEM INCLUDING CAMERA AND COMPUTER HAVING INTER-DEVICE CONTROL CAPABILITY AND CAMERA THEREOF

The present invention claims a priority based on the Japanese Patent Application No. H10-68975, the content of which is incorporated hereinto by reference in its entirety.

BACKGROUND OF THE INVENTION

1. Field of the Invention

This invention relates to a camera for photographing an object and acquiring an image data of the object, and to a camera system including a computer having a connector which allows a camera to be connected with the computer. This invention also relates to a camera used in said system.

2. Description of the Related Art

Image data taken by a digital camera is typically loaded into a computer using an image loading software (or a driver software) for the digital camera. The image taken into the computer is processed, printed, or recorded using an application software installed in the computer. Some camera systems allow the live-view image being taken by the digital camera to be displayed on the monitor screen of the computer with help of the driver software, or allows the shutter of the digital camera to be released by the driver software.

However, in these conventional techniques, the user interface of the digital camera and that of the personal computer are different in shape and operation, and therefore it is required for the user to become proficient in the use of both interfaces.

When a digital camera is connected to a personal computer to operate the digital camera, the digital camera and the personal computer cooperate with each other. Nevertheless, since the user interfaces of the digital camera and the personal computer are different in shape and operation, the user confuses the operation of these interfaces. In addition, the user should select one of these interfaces in accordance with a required operation, which also causes confusing and troublesome operations.

Further, in a case where a digital camera is connected to a computer, although they exchange their data with each other, these data exchange can not be performed in a single action.

SUMMARY OF THE INVENTION

Therefore, it is an object of the present invention to provide a camera system in which a camera and a personal computer are connected to each other, and which enables an easy operation of the digital camera.

It is another object of the present invention to provide a camera suitably used in the above-mentioned camera system.

To achieve these objects, in one aspect of the present invention, a camera system includes a camera for photographing an object and acquiring an image data of the object, a computer connectable to the camera, a manipulation member provided to the camera, and a camera controller provided to the camera. The camera controller detects the operation of the manipulation member and transmits the detected signals based on the detected results to the computer. The camera system further includes a controller provided in the computer to control the screen of the display functioning together with the computer based on the signal received from the camera.

With this camera system, since the screen of the computer is controlled in accordance with the operation of the manipulation member of the camera, the user can control the screen of the computer from the camera side.

In a case where an operation of the manipulation member of the camera is to specify a folder for transferring image data photographed by the camera to the computer, the user can specify the folder in the computer from the camera side.

BRIEF DESCRIPTION OF THE DRAWINGS

The above and other objects, features, and advantages of the present invention will be apparent from the following detailed description of the preferred embodiments with reference to the attached drawings, wherein:

FIGS. 7(a) and 7(b) illustrate a screen D10 in the screen transition shown in FIG. 6, wherein FIG. 7(a) illustrates a screen of the personal computer and FIG. 7(b) illustrates a screen of the digital camera;

FIGS. 8(a) and 8(b) illustrate a screen D12 in the screen transition shown in FIG. 6, wherein FIG. 8(a) illustrates a screen of the personal computer and FIG. 8(b) illustrates a screen of the digital camera;

FIGS. 9(a) and 9(b) illustrate a screen D13 in the screen transition shown in FIG. 6, wherein FIG. 9(a) illustrates a screen of the personal computer and FIG. 9(b) illustrates a screen of the digital camera;

FIGS. 13(a) and 13(b) illustrate a screen D40 in the screen transition shown in FIG. 6, wherein FIG. 13(a) illustrates a screen of the personal computer and FIG. 13(b) illustrates a screen of the digital camera;

FIG. 15 illustrates a screen D50 in the screen transition shown in FIG. 6, wherein the screen is displayed on the digital camera.

DETAILED DESCRIPTION OF THE PREFERRED EMBODIMENTS

The preferred embodiment of the present invention will now be described in detail using an example of digital camera as a computer-peripheral apparatus.

<Structure of the Digital Camera>

Figure 1:
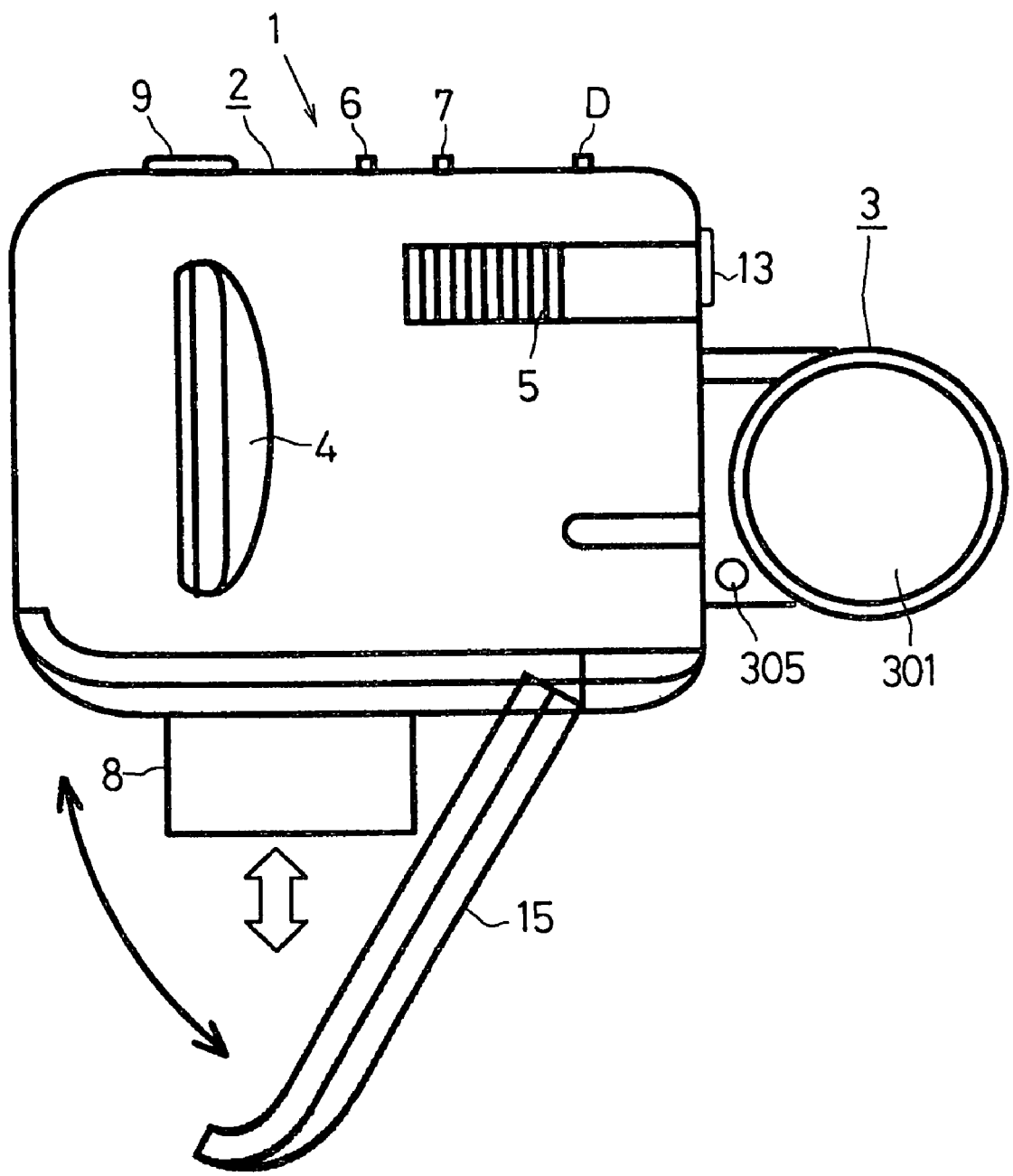
FIG. 1 is a front view of the digital camera according to an embodiment of the present invention, which can be used in a digital camera system.
Figure 2:
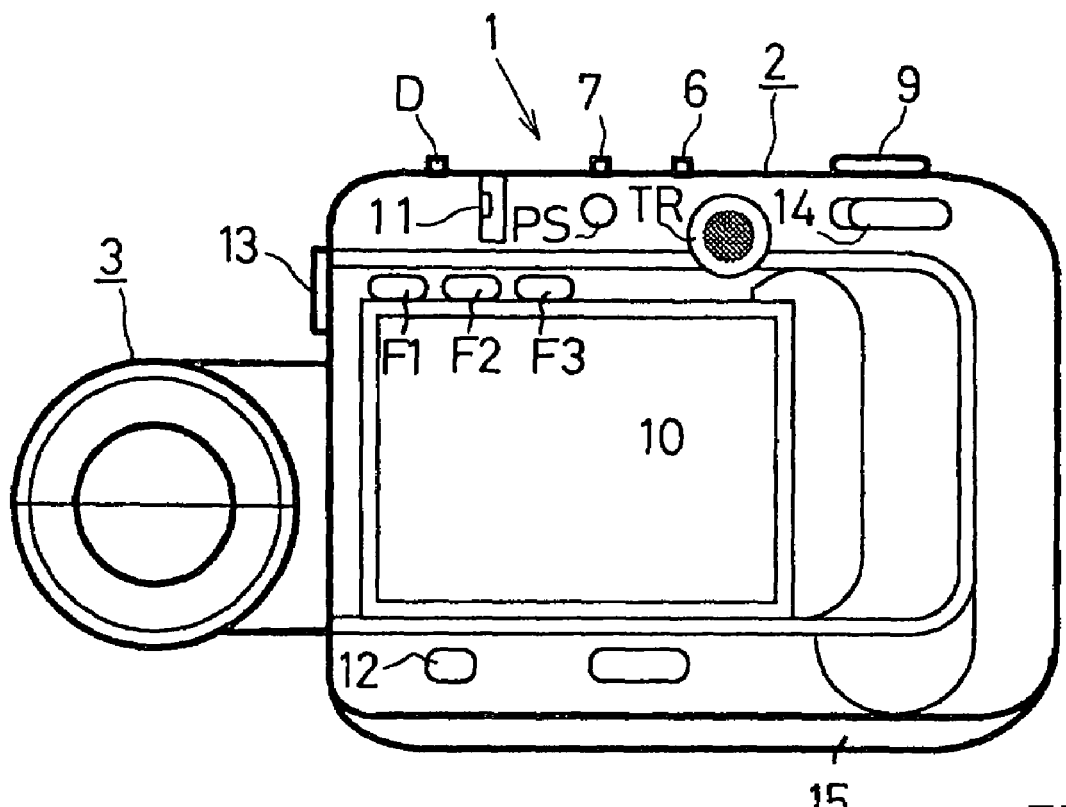
FIG. 2 is a rear view of the digital camera shown in FIG. 1.
Figure 3:
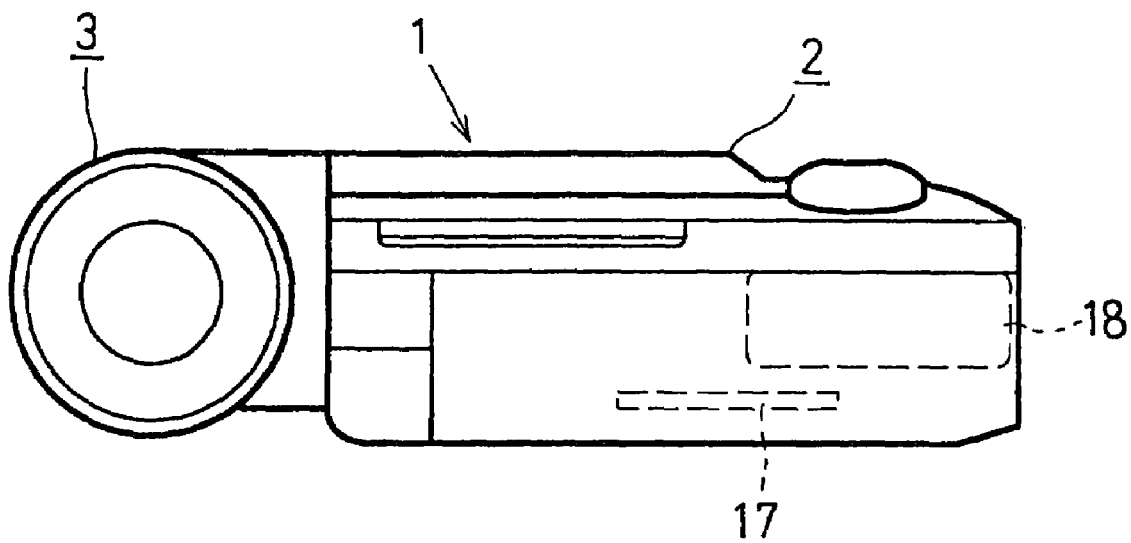
FIG. 3 is a bottom view of the digital camera shown in FIG. 1.

As shown in FIGS. 1–3, a digital camera 1 comprises a camera frame, which is referred to as a main body 2, and a photographing unit 3 which is attachable to and removable from the main body 2 on the right side of the main body 2 in the front view shown in FIG. 1. The photographing unit 3 is pivotable within a plane parallel to the right side of the main body 2.

The photographing unit 3 has an image pick-up device comprising a zoom lens 301 and a photoelectric conversion device such as a CCD (Charge Coupled Device) array, to convert the optical image of an object into an electric image consisting of charge signals, each of which was generated by each pixel of the CCD via photoelectric conversion. The main body 2 has a display or LCD (Liquid Crystal Display) 10, a slot 17 for receiving a memory card 8, and a connection terminal 13 for connecting the digital camera to a personal computer. The image signal taken by the photographing unit 3 is subjected to a prescribed image processing in the main body 2. The processed image is displayed on the LCD display 10, recorded into the memory card 8, or transferred to the personal computer.

A zoom lens 301 is provided in the photographing unit 3. An image pick-up circuit including a CCD color area sensor 303 is located at an appropriated position behind the zoom lens 301. A light adjusting circuit 304 having a photo sensor 305 for receiving flash light reflected from the object is provided at an appropriated position in the photographing unit 3.

As shown in FIG. 1, a grip 4 is formed in the left-hand upper side of the front face of the camera main body 2, and a built-in flash device 5 is provided in the right-hand upper side at an appropriate position. Frame forward and backward switches 6 and 7 are provided near the center of the top face of the main body 2 as shown in FIG. 2. The forward switch 6 feeds the frame in the direction that the frame number increases in the photographed order, and is referred to as an UP key 6. The backward switch 7 feeds the frame in the direction that the frame number decreases, and is referred to as a DOWN key 7. A clear key D for clearing or deleting the images recorded in the memory card 8 is provided on the left of the DOWN key 7, and a shutter button 9 is provided on the right of the UP key 6 in the rear view shown in FIG. 2.

As shown in FIG. 2, an LCD 10 is provided in the middle of the left-hand side of the rear face of the camera main body 2. The LCD 10 functions as a view finder during photographing, and as a display during the reproduction of the recorded image. A compression rate setting slide switch 12 for switching the compression rate K of the image data to be recorded in the memory card 8 is positioned below the LCD 10. The connection terminal 13 for connecting a personal computer is positioned on the side face of the main body 2 near the photographing unit 3. A power switch PS is provided on the top of the rear face of the main body 2.

Further, a trackball TR used as a pointing device for moving cursor displayed in the LCD 10 is provided at the right-upper side of the LCD 10. Provided at upper side of the LCD are function keys F1, F2 and F3 for executing a set specific function. Each function key enables to select and register the action when the key is pressed, and the registered content is stored in a nonvolatile memory 211a in the general controller 211.

The flash device (which may be abbreviated as FL) of the digital camera 1 has an "automatic flash mode", a "forcible flash mode", and a "flash prohibition mode". In the "automatic flash mode", the built-in flash device 5 automatically emits flash light according to the brightness of the object. In the "forcible flash mode", the built-in flash device 5 forcibly emits flash light regardless of the brightness of the object. In the "flash prohibition mode", light emission of the built-in flash device 5 is prohibited. Every time the user presses the FL mode setting key 11 positioned above the LCD 10 on the rear face of the main body 2, the flash mode is switched among three modes in a cyclic order. The digital camera 1 has a ⅛ compression rate and a ¹/₂₀ compression rate, and the user can select the preferred compression rate K. For example, if the compression rate setting switch 12 is shifted to the right, the compression rate K is set to ⅛, and if it is shifted to the left, the compression rate K is set to ¹/₂₀. Although, in this embodiment, the compression rate K is set to two values, it may be set to three or more values.

A photographing/reproduction mode setting switch 14 is positioned at the top right of the rear face of the main body 2. Digital pictures are taken in the photographing mode. In the reproduction mode, the digital images recorded in the memory are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected.

The FL mode setting switch 11, the UP key 6, the DOWN key 7 and the shutter button 9 are composed of a push switch, respectively.

A card insertion slit 17 for receiving the memory card 8 and a battery cavity 18 are positioned on the bottom face of the main body 2. The slit 17 and the battery cavity 18 are covered with a clam-shell type cover 15. The digital camera 1 is loaded with a power supply source E consisting of four AA batteries connected in series.

Figure 4:
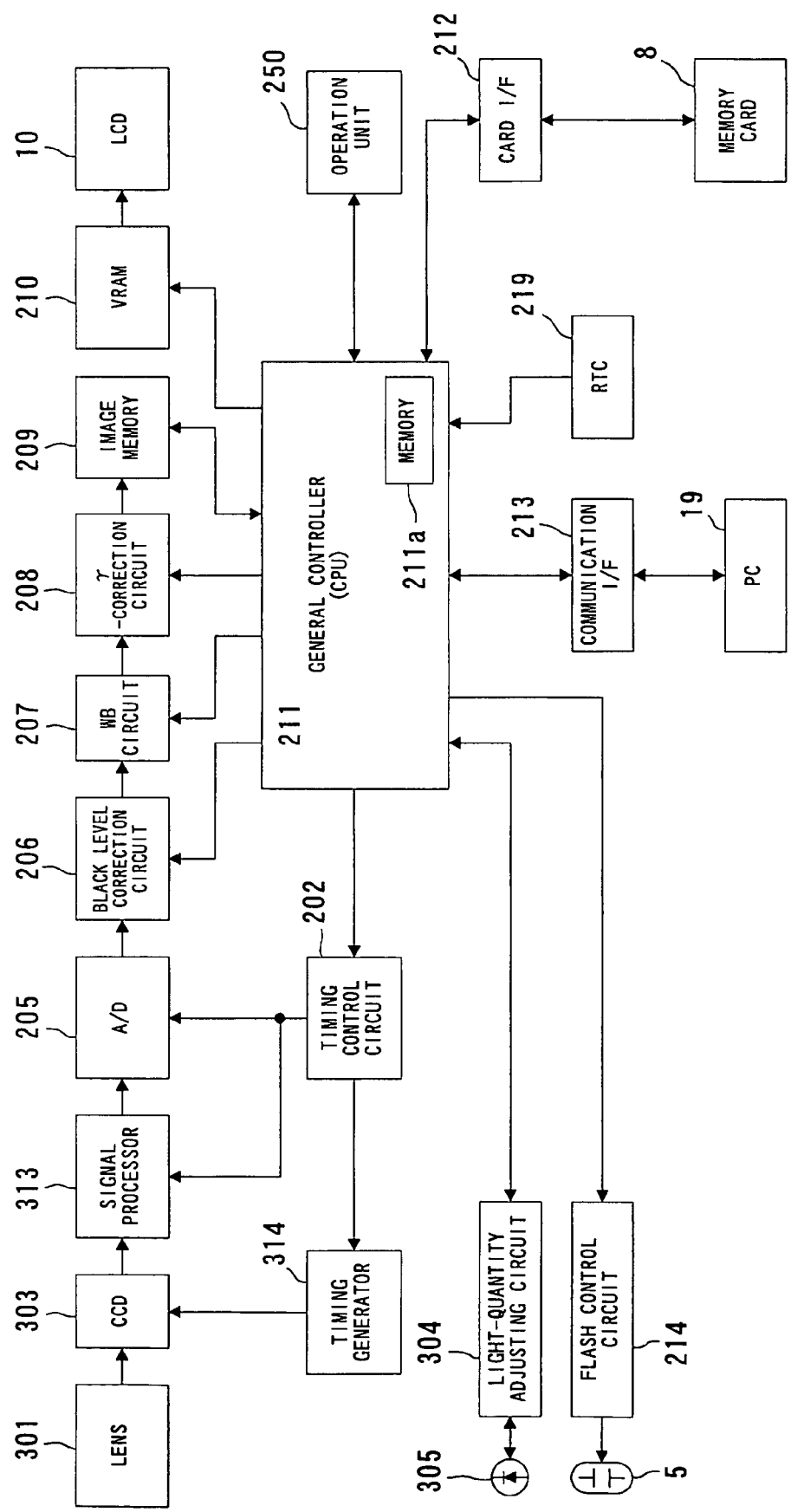
FIG. 4 is a block diagram of the control system of the digital camera shown in FIGS. 1 through 3.

FIG. 4 is a block diagram of the control system of the digital camera 1.

The CCD 303 in the photographing unit 3 photoelectrically converts the optical image of the object focused by the zoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the photographing unit 3 is fixed, the exposure of the photographing unit 3 is controlled by adjusting the quantity of exposure of the CCD 303, that is, the charge accumulation time of the CCD 303, which correspond to the shutter speed. If the brightness of the object is too low to select to an appropriate shutter speed, the level of the image signal output from the CCD 303 is adjusted in order to compensate for the insufficient exposure. In other words, at a low brightness, the exposure is controlled by adjusting both the shutter speed and the gain. The level of the image signal is adjusted by controlling the gain of the AGC circuit in the signal processor 313.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These timing signals are supplied to the CCD 303.

The signal processor 313 applies prescribed analogue signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 controls the light emission of the built-in flash device 5 to a predetermined level determined by the general controller 211 when the flash device is used during the photographing. During the flash photographing, the flash light reflected from the object is received by the photo sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 stops the light emission of the built-in flash device 5, whereby the light emission amount of the built-in flash device 5 can be regulated to the prescribed level.

The A/D converter 205 provided in the main body 2 of the digital camera 1 converts each pixel signal (i.e., analog signal) of the image signal sequence into a 10-bit digital signal based on the A/D conversion clock supplied from the A/D clock generator (not shown).

A reference clock/timing generator 314 and a timing control circuit 202 are also provided in the main body 2. The timing control circuit 202 is controlled by the general controller 211, and generates a clock for the A/D converter 205.

A black level correction circuit 206 corrects the black level of the digitalized pixel signal (hereinafter referred to as pixel data) converted by the A/D converter 205 to the reference black level. A white balance circuit (hereinafter referred to as WB circuit) 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (or the slope of the characteristic line) for each color component in the level conversion table is set each photographed image by the general controller 211.

The γ correction circuit 208 corrects for the γ characteristic of the pixel data. The γ correction circuit 208 has, for example, six γ correction tables with different γ characteristics, and uses the most appropriate γ correction table according to the photographed scene or the photographic conditions.

An image memory 209 stores the pixel data output from the γ correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data which is to be reproduced and displayed on the LCD 10. The memory capacity of the VRAM 210 corresponds to the number of pixels of the LCD 10.

In the photographing preparation mode, each pixel data of the image taken by the photographing unit 3 every ¹⁄₃₀ seconds is subjected to the prescribed signal processing by the sequence from the A/D converter 205 to the γ correction circuit 208, and stored in the image memory 209. This pixel data is simultaneously transferred to the VRAM 210 via the general controller 211, and displayed on the LCD 10. The user can see the photographed object on the LCD 10. In the reproduction mode, the image read out from the memory card 8 is subjected to the prescribed signal processing by the general controller 211, which is then transferred to the VRAM 210, and displayed on the LCD 10.

A card I/F 212 is an interface for writing and reading image data into and from the memory card 8. A communication I/F 213 is an interface, for example based on the USB standard, which allows the digital camera to be externally connected to a computer.

A flash control circuit 214 controls light emission of the built-in flash device 5. In particular, the flash control circuit 214 controls the quantity of flash light, flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown).

An operation unit 250 has switches corresponding to the UP key 6, the DOWN key 7, the shutter button 9, the FL mode setting key 11, the compression rate setting key 12, and the photographing/reproduction mode setting switch 14, and the function keys F1, F2, F3.

The general controller 211 comprises a microcomputer, and it organically controls the driving timing of each element in the photographing unit 3 and the main body 2 so as to generally control the photographing operation of the digital camera 1.

If in the photographing mode the shutter button 9 is pressed to start photographing, the general controller 211 creates tag information (such as the frame number, exposure value, shutter speed, compression rate K, photographing date and time, flash ON/OFF data, scene information, image determination result, etc), store the tag information in the memory card 8, together with the thumb nail image created from the image taken in the image memory 209 after the start of the photographing operation, and the compressed image created by a JPEG method at a predetermined compression rate K.

The memory card 8 can store forty frames of images taken by the digital camera 1 at a compression rate of ¹⁄₂₀. Each of the frames has tag information, high-resolution image data (640×480 pixels) compressed by a JPEG method, and thumb nail image data (80×60 pixels). Each frame may be treated as an image file of, for example, an EXIF format.

<Overall Structure of the Digital Camera System>

Figure 5:
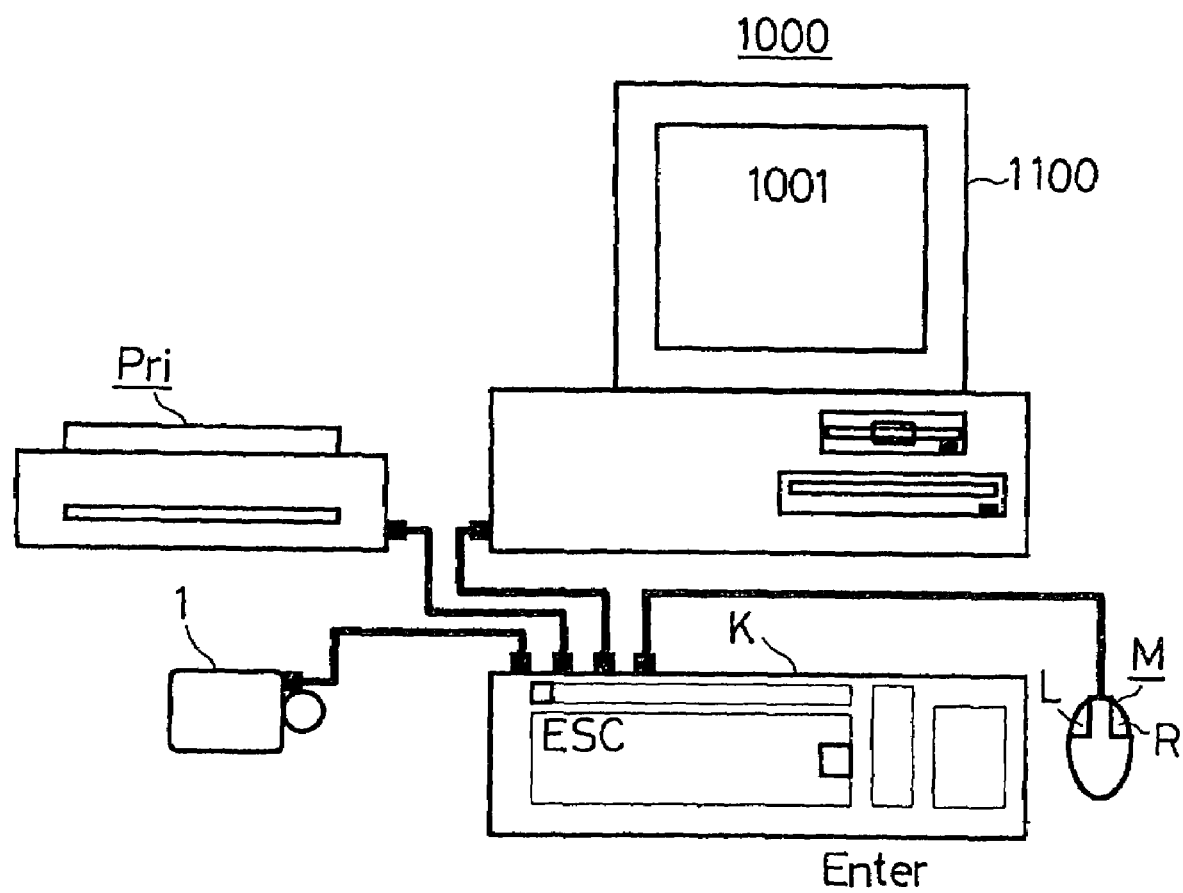
FIG. 5 illustrates an overall construction of a digital camera system according to one embodiment of the present invention.

FIG. 5 illustrates the overall structure of the digital camera system.

A digital camera 1 is connected to a desktop type personal computer 1000. A keyboard K and a mouse M, which are manipulation devices for the computer 1000, and a printer are also connected to the computer 1000 via USB cables. The personal computer 1000 has a display 1100 which comprises, for example, a CRT or LCD. The display 1100 display various images in connection with the operations of the digital camera 1. The keyboard K can function as a hub of the USB interface, other than its original function. A driver software for the digital camera, that is, a computer program, is installed in the personal computer 1000 in advance so as to enable various controls between the digital camera 1 and the personal computer 1000. The driver software may be installed in the personal computer 1000 via a recording medium, such as a CD-ROM. The driver software can be transferred from the server to the computer 1000 via the network, and installed in the computer 1000. The driver software includes those supplied form as compressed, combined, or divided files from the media or the server. The driver software also includes those modified to executable forms during or after the installation in the computer 1000.

Figure 7A:
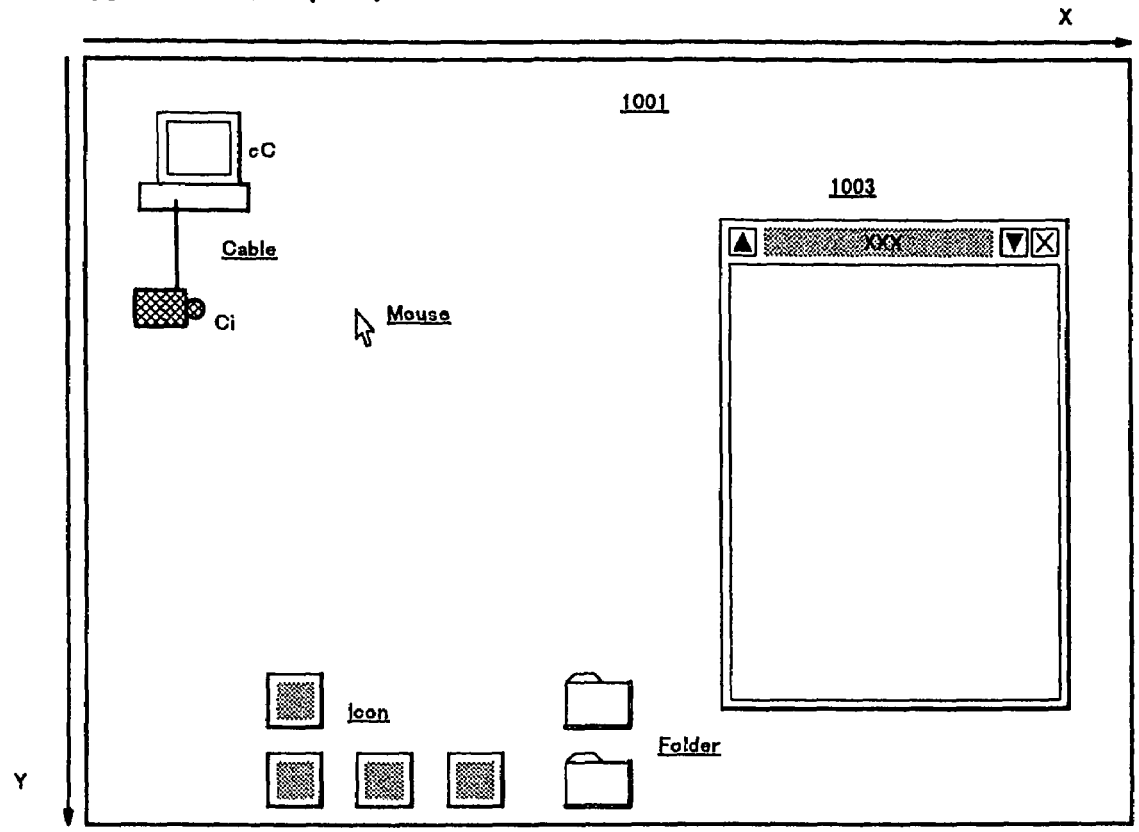
Figure 7B:
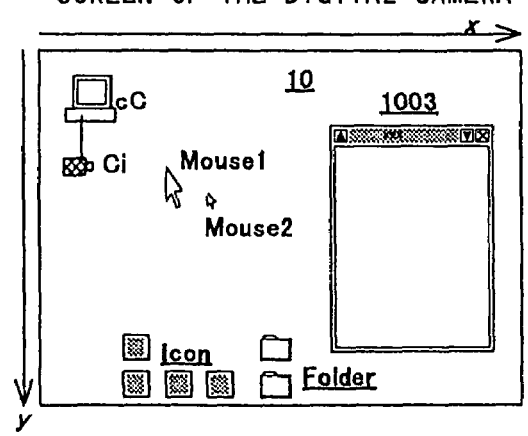

When the digital camera 1 is connected to the USB port of the key board K in a state where the personal computer 1000 is activated, the icon "Ci" representing the digital camera 1 is displayed on the screen 1001 of the personal computer 1000 as shown in FIG. 7(*a*). Also displayed on the screen 1001 are data or application icons "Icon", folder icons "Folder", the icon "cC" representing the personal computer 1000 itself, and an opened window 1003. Since the digital camera 1 is connected to the personal computer 1000, a cable connecting the icon "Ci" representing the digital camera 1 and the icon "cC" representing the personal computer 1000 is also displayed on the screen of the personal computer 1000.

Figure 6:
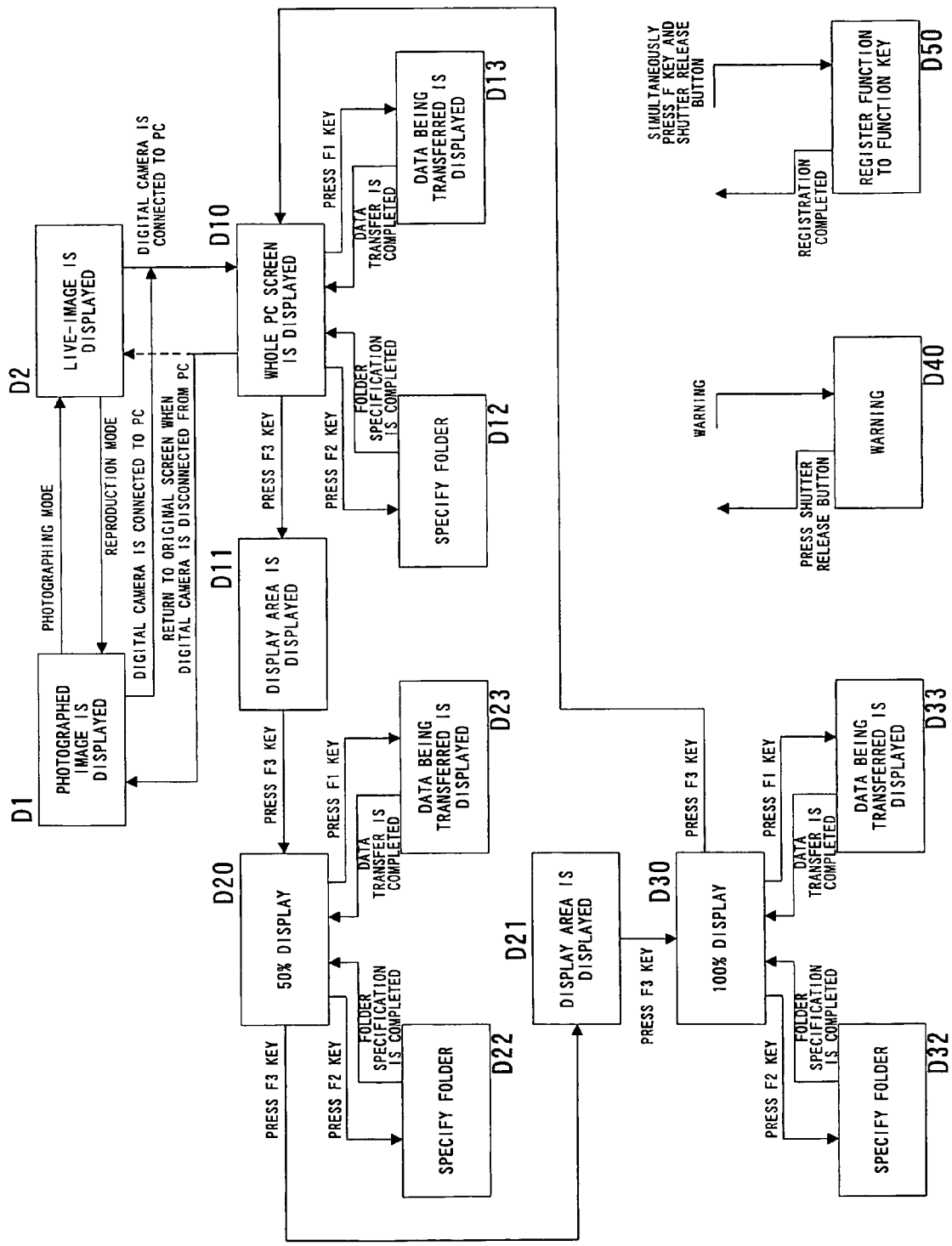
FIG. 6 illustrates a screen transition in the system shown in FIG. 5.

FIG. 6 shows a screen transition diagram of the system. In FIG. 6, the personal computer 1000 is abbreviated to "PC".

In a case where the digital camera 1 is not connected to the personal computer 1000, it is possible for the user to select a preferable mode between the reproduction mode and the photographing mode by operating the mode setting switch 14. In the reproduction mode, the photographed image is displayed on the screen (D1), and in the photographing mode, a live-image is displayed (D2).

In either state D1, D2, when the digital camera 1 is connected to the personal computer 1000, the driver software pre-installed in the personal computer 1000 detects the connection of the digital camera 1, and transmits the screen display data of the personal computer 1000 to the digital camera 1. On the other hand, the digital camera 1 receives the data to display them on the LDC 10. Each screen of the personal computer 1000 and the digital camera 1 transits to D10 shown in FIGS. 7(*a*) and 7(*b*), respectively. On the other hand, when the digital camera 1 is disconnected from the personal computer 1000, the screen D10 returns to the original screen (D1 or D2).

In the screen D10 as shown in FIGS. 7(*a*) and 7(*b*) respectively, the screen of the display 10 of the digital camera 1 coincides with that of the display 1001 of the personal computer 1000. However, the LCD 10 of the digital camera 1 has a resolution of 240×320 dots, and the display of the personal computer 1000 has a resolution of 600×800 dots, for example. Therefore, the LCD 10 of the digital camera 1 displays the whole screen of the personal computer by thinning out the image data. (X, Y) and (x, y) in the drawings denote X-Y coordinates of the display of the personal computer 1000 and that of the digital camera 1, respectively, and the unit of each coordinate is a pixel. This directly corresponds to the address of VRAM (Video RAM).

If the mouse cursor displayed on the display 1001 of the personal computer 1000 is also reduced to be displayed on the LCD 10 of the digital camera 1, the mouse cursor is displayed as an arrow marked "Mouse 2" shown in FIG. 7(*b*), which is very hard to be recognized on the LCD 10 of the digital camera 1. To avoid this disadvantage, only the mouse cursor is not reduced to be displayed on the LCD 10 of the digital camera 1 as an arrow marked "Mouse 1" shown in FIG. 7(*b*).

In accordance with the operation of the trackball TR of the digital camera 1, not only the mouse cursor on the screen of the personal computer 1000 but the mouse cursor on the LCD of the digital camera 1 move in a synchronized manner. This allows the user to click buttons on the window or to drag the icon, for example, by operating the mouse cursor on the LCD of the digital camera as if the user operates the personal computer 1000 by using the mouse thereof. The relationship between the operation switches (manipulation devices) of the digital camera and the manipulation devices of the personal computer is shown in Table 1. As is apparent from the Table 1, it is possible for the user not only to move the mouse cursor but to operate the personal computer by operating the switch of the digital camera 1 corresponding to the manipulation device of the personal computer 1000.

TABLE 1

| Switches of the digital camera | Manipulation devices of the personal computer |
| --- | --- |
| Trackball TR | Mouse M |
| DOWN key 7 | Left button L of the mouse |
| UP key 6 | Right button R of the mouse |
| Shutter button 9 | Enter key ENTER |
| FL mode setting switch 11 | Escape key ESC |

Figure 8A:
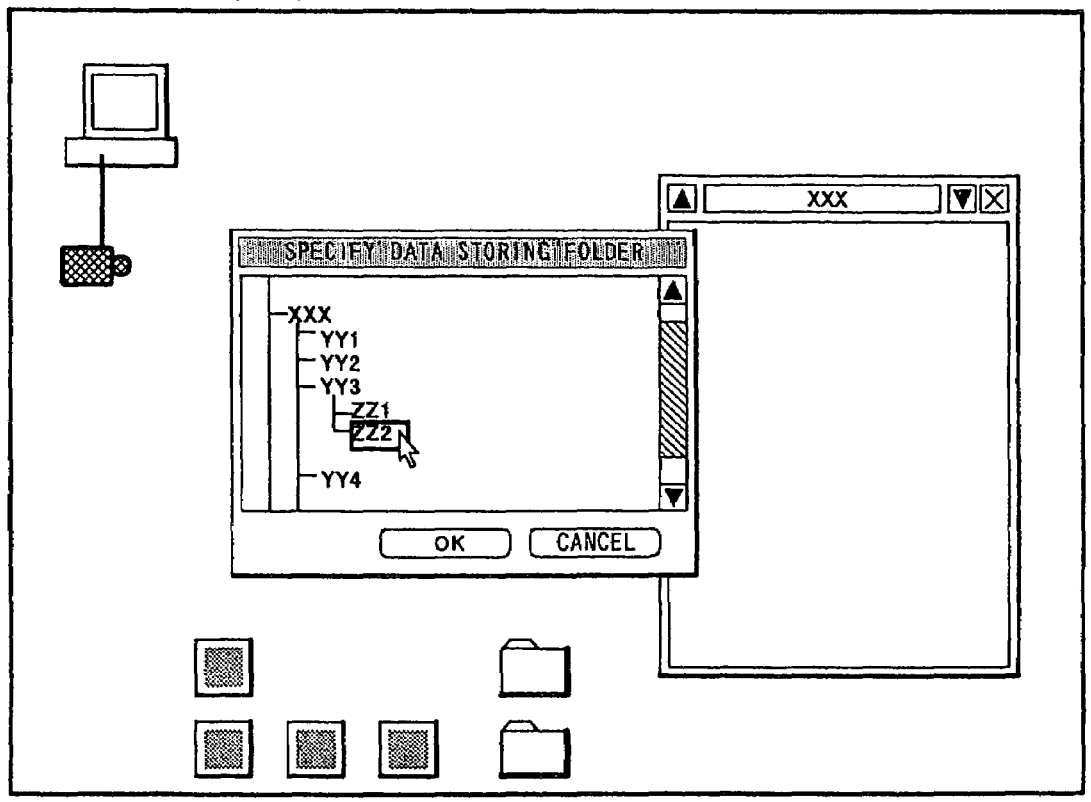
Figure 8B:
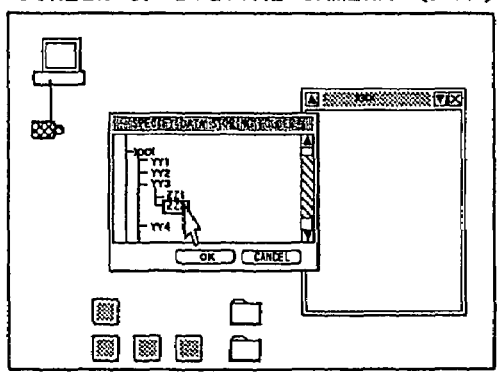

If the function key F2 is pressed, the screen transits to the folder specify screen D12 as shown in FIGS. 8(*a*) and 8(*b*).

The function key F2 is used to specify a folder when the photographed data of the digital camera 1 is transferred to the personal computer 1000. When the function key F2 is pressed, the contents registered in the memory 211*a* is called via the generals controller 211. Based on the contents, the personal computer 1000 is activated to display the dialog for specifying a folder to store the photographed data on the screen 1001 of the personal computer 1000. At the same time, as shown in FIG. 8(*b*), the same dialog is displayed on the LCD 10 of the digital camera 1.

As shown in FIGS. 8(*a*) and 8(*b*), if the folder \XXX\YY3\ZZ2, for example, is selected and then clicked, the folder is framed. In this state, if the OK button is clicked (the mouse cursor is moved onto the OK button by using the trackball TR, and then the DOWN key 7 is pressed), the dialog is closed in a state that the folder is selected. And the screen D12 returns to the screen D10. Thus, a folder of the personal computer in which the photographed data is to be stored can be specified by the digital camera 1.

Next, if the function key F1 is pressed, the screen transits to the photographed data transit screen D13 shown in FIGS. 9(*a*) and 9(*b*). In the function key F1, a function for executing a transfer of the photographed data of the digital camera 1 to the personal computer is previously registered. When the function key F1 is pressed, a dialog showing that the photographed data is being transferred is displayed on the display of the personal computer 1000, as shown in FIG. 9(*a*). At the same time, as shown in FIG. 9(*b*), the same dialog is displayed on the LCD 10 of the digital camera 1. This dialog includes an upper progress bar showing the current transferring frame number and its current state and a lower progress bar showing the total number of frames to be transferred and its current state. By clicking the transfer stop button, it is possible for the user to interrupt the transferring. After the completion or the interruption of the transfer, the screen returns to D10.

In a case where it is too small for the user to recognize the personal computer's screen in a whole display screen D10, by pressing the function key F3 twice, the display magnification rate is changed to 50%. The "50%" means that the thinning out rate of the displayed data is 50%, in other words, among the whole screen of the personal computer (600×800 dots), the area of 480×640 dots is displayed on the liquid display 10 of the digital camera 1 (240×320 dots). That is, the image data of 480×640 dots is thinned out by 50% in both the horizontal and vertical directions, and is displayed as the image data of 240×320 dots. In the screen D11, a preferable display area is selected.

Figure 10:
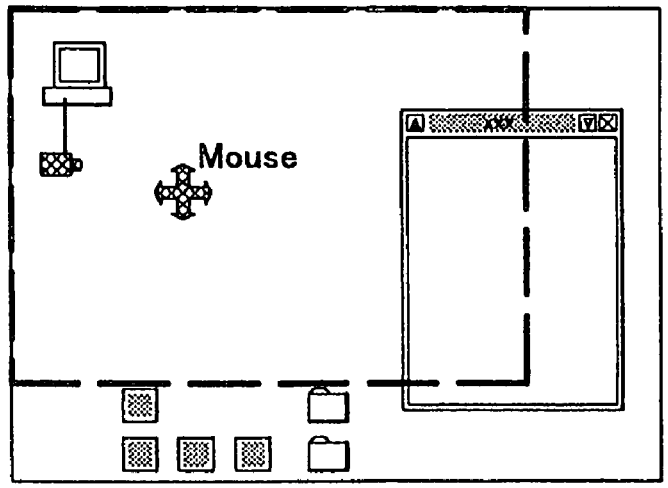
FIG. 10 illustrates a screen D11 of the digital camera in the screen transition shown in FIG. 6.
Figure 11A:
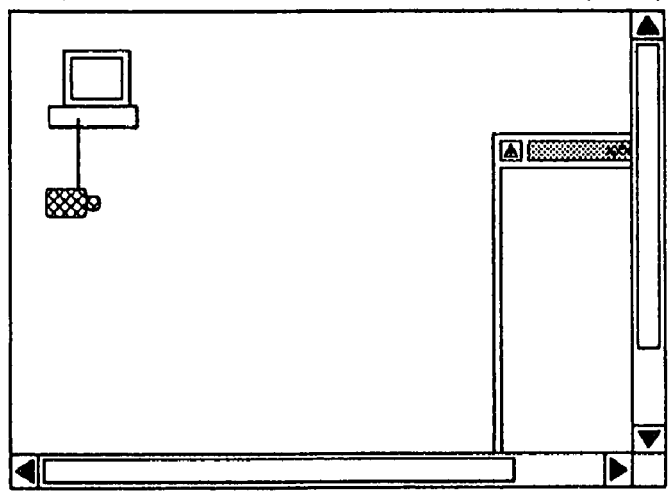
FIG. 11(a) illustrates a screen of the digital camera D20 in the screen transition shown in FIG. 6.

If the function key F3 is pressed in the screen D10, the screen D10 transits to a display area change screen D11 in accordance with the display magnification rate change at the digital camera 1. Though the display change area screen D11 shown in FIG. 10 is displayed on the LCD of the digital camera, the screen of the personal computer remains D10. In the screen of the digital camera 1, a broken-line frame is displayed at the left side of the screen D10, and the mouse cursor is changed into a moving cursor. The broken-line frame shows a display area when the display magnification rate is set 50%, and can be horizontally moved by operating the trackball TR. By pressing the function key F3 again after the broken-line frame is moved to a desired position, the screen transits to the 50% display screen D20 as shown in FIG. 11(a). In the screen D20, the display magnification rate is different, but the relationship between the operation members of the digital camera and the personal computer is the same as in the screen D10. Since only a portion of the screen of the personal computer is displayed, vertical and horizontal scroll bars are displayed.

Figure 11B:
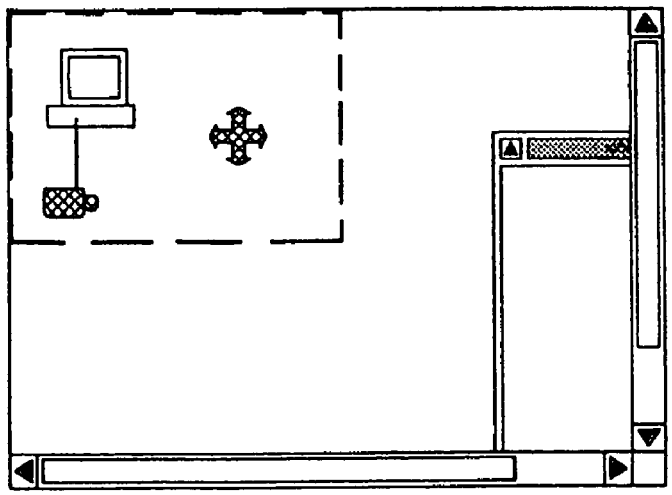
FIG. 11(b) illustrates a screen D21 of the digital camera in the screen transition shown in FIG. 6.

By pressing the function key F3 in the screen D20, the screen D20 transits to a display area change screen D21 as shown in FIG. 11(b) in accordance with the display magnification rate change. Though the display magnification rate and the size of the broken-line frame are different from those of the screen D11, the operation is the same as in the screen D11.

Figure 12:
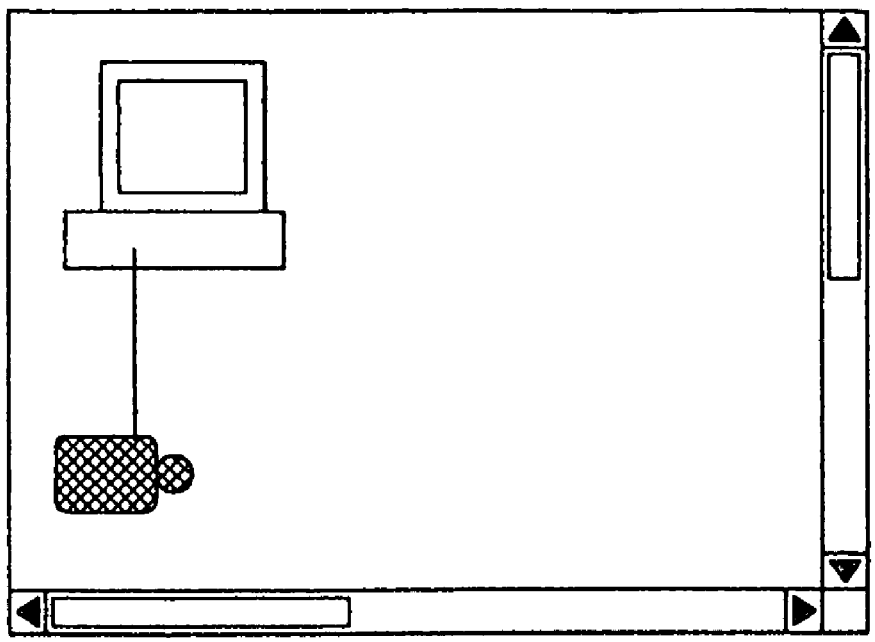
FIG. 12 illustrates a screen of the digital camera D30 in the screen transition shown in FIG. 6.

By pressing the function key F3 again, the screen transits to the 100% display screen D30 shown in FIG. 12. The 100% display screen means that the image data of the screen of the personal computer 1000 is displayed on the screen of the digital camera 1 of 240×320 dots without thinning out. Only the area of 240×320 dots among the whole screen of the personal computer 1000 of 600×800 dots is displayed as shown in FIG. 12. By pressing the function key F3, the screen returns to the screen D10.

As explained above, in a case where the displayed content on the LCD 10 of the digital camera 1 is small, the user can enlarge it by changing the display magnification rate. Further, when the display magnification rate is changed, since the display confirmation frame for confirming the display area is displayed on the LCD 10 of the digital camera 1, the most appropriate display magnification rate can be set.

The magnification rates are not limited to two fixed rates of 50% and 100%. The magnification rate may be only to one rate, three or more rates, or continuously changeable rates.

Figure 9A:
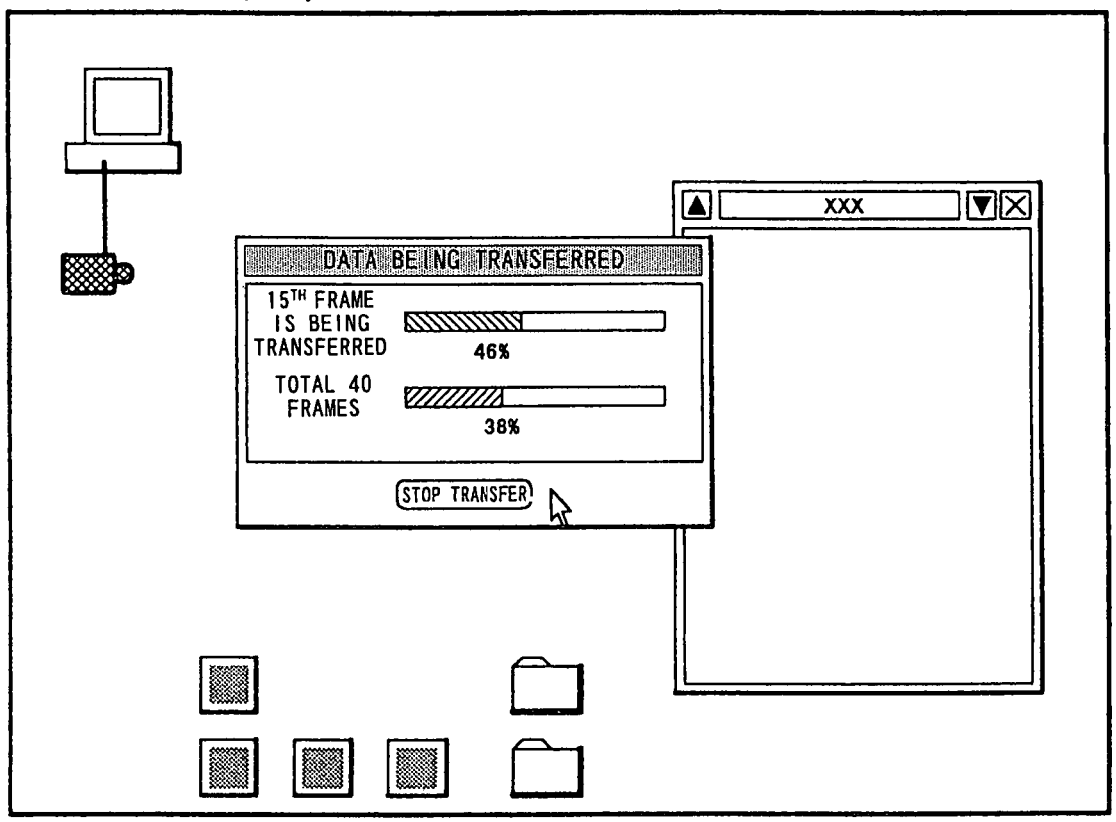
Figure 9B:
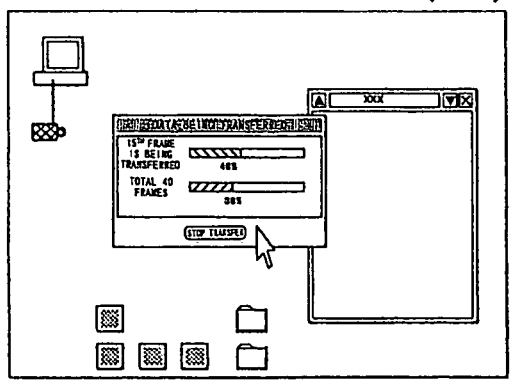

The data transferring display screen D23, D33, to which the screen D20, D30 transits by pressing the function key F1, is the same as the screen D13 shown FIGS. 9(a) and 9(b), except that the display magnification rates are different and the scroll bars are displayed on the screen of the digital camera 1. The folder specifying screen D22, D32, to which the screen D20, D30 transits by pressing the function key F2, is the same as the screen D12 shown in FIGS. 8(a) and 8(b), except that the display magnification rates are different and the scroll bars are displayed on the screen of the digital camera 1.

Figure 13A:
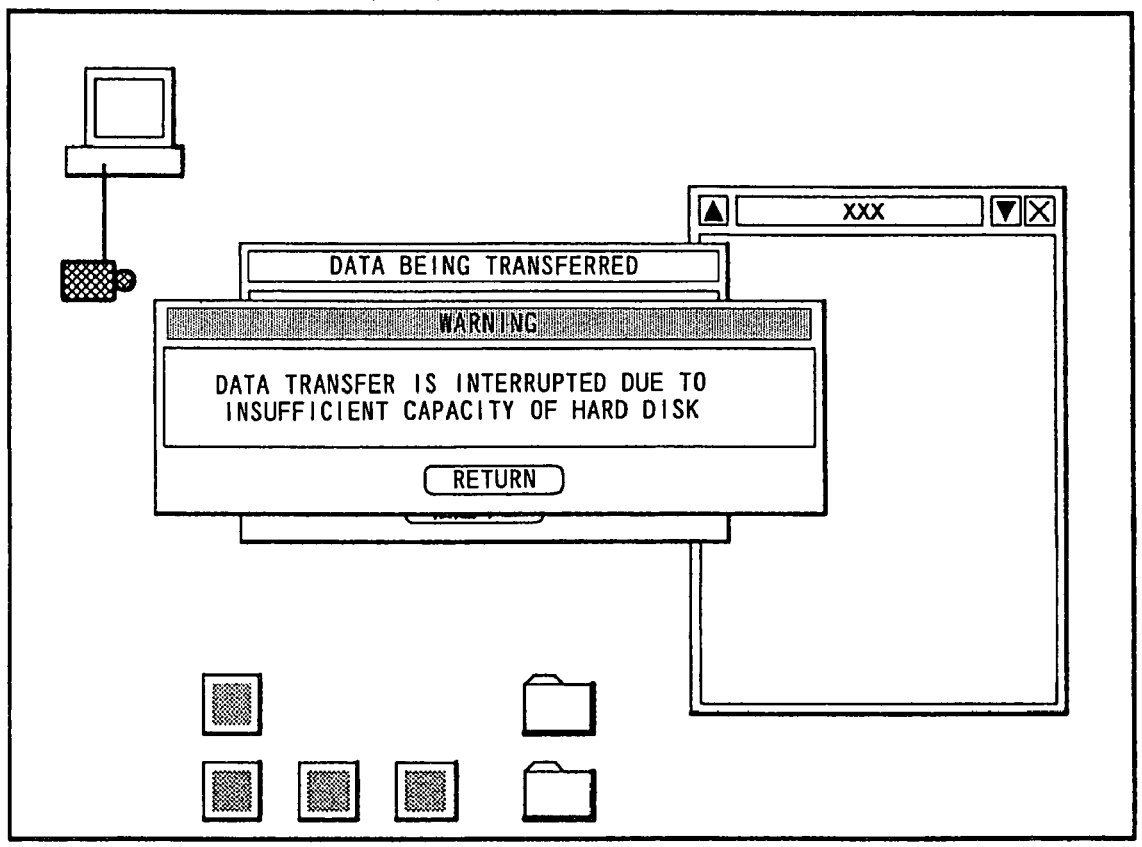
Figure 13B:
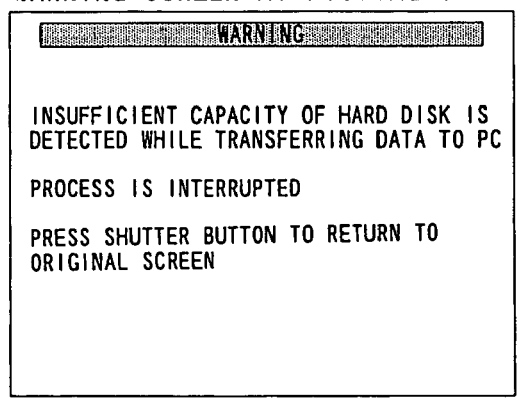

Next, the warning screen D40 will be explained. In a case where some warning is required as a system in which the digital camera 1 is connected to the personal computer 1000, the screen transits to the warning screen D40. The following is an example of a warning when the capacity of the hard disc drive of the personal computer became insufficient during the data transferring, with reference to FIGS. 13(a) and 13(b). When the capacity became insufficient, a warning dialog is displayed on the center portion of the screen of the personal computer 1000, as shown in FIG. 13(a). On the other hand, displayed on the LCD 10 of the digital camera 1 is a warning message only as shown in FIG. 13(b). The reason that the warning screen of the personal computer and that of the digital camera are different is as follows.

In a case where a warning dialog is to be displayed, it is required to convey some messages to the user. However, as mentioned above, even if the display 1001 of the personal computer 1000 can appropriately display a warning dialog, the LCD 10 of the digital camera 1 may not be able to appropriately display the same dialog because of the different resolution of the display of the digital camera 1 and that of the personal computer 1000. Accordingly, although the screen of the digital camera and that of the personal computer are synchronized in a normal state, in a case where a warning dialog is to be displayed, the warning message is surely conveyed to the user by displaying in a different manner between the digital camera and the personal computer.

<Synchronized Control of the Screens of the Digital Camera and the Personal Computer>

Figure 14:
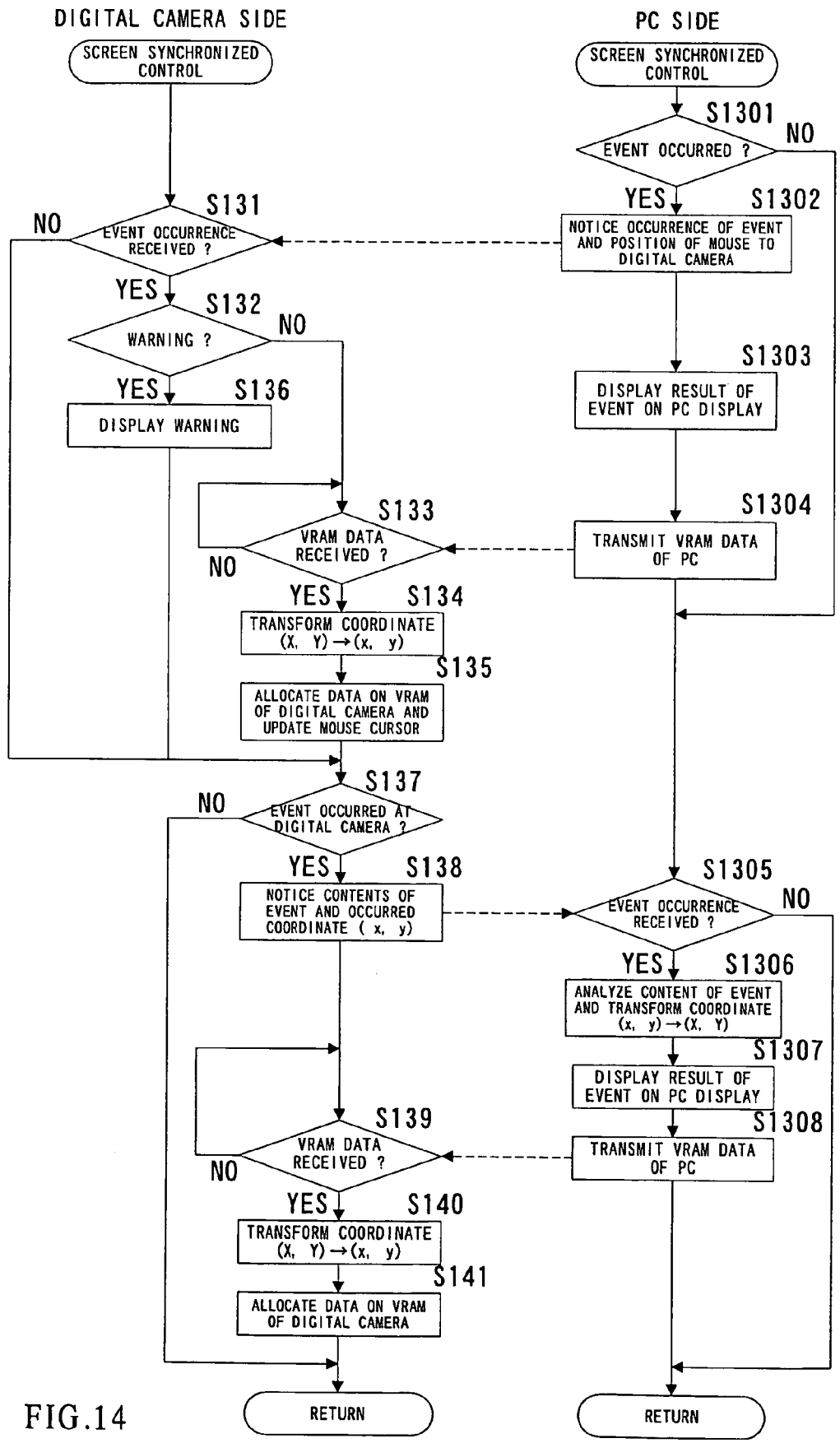
FIG. 14 is a flowchart showing a synchronizing control process of the screens of the digital camera and the computer.

The synchronized control of the screen of the digital camera and that of the personal computer will be explained as follows with reference to the flowchart of FIG. 14.

1. In a case where an event is occurred in the personal computer.

In step S1301 (hereinafter referred to as 'S1301' or the similar), it is determined if the personal computer detected that an event, for example, the digital camera is connected to the personal computer, the key board or the mouse is operated, an error occurs, or an interrupt signal is received, occurs. If such an event is detected (YES in S1301), the fact that an event occurs and the content of the event as well as the position of the mouse of the personal computer, is noticed to the digital camera in S1302, and the result of the event is displayed on the screen of the personal computer in S1303. Thus, the VRAM (video RAM) data of the personal computer is updated. Thereafter, the personal computer transmits the VRAM data to the digital camera in S1304.

In Step 131, if the digital camera 1 receives an event signal from the personal computer 1000, the digital camera 1 analyzes it to determine if a warning is concerned with an error in S132. If NO in S132, the digital camera 1 waits to receive a VRAM data from the personal computer 1000 in S133.

If the digital camera 1 receives the VRAM data from the personal computer (YES in S133), a coordinate transformation is conducted in S134. This transformation is to allocate the coordinate (X, Y) of the VRAM data transmitted from the personal computer 1000 into the coordinate (x, y) of the VRAM of the digital camera 1. The process differs depending on the current screen mode of the personal computer 1000 or the digital camera 1. Provided that the screen of the personal computer 1000 has 600×800 dots, the screen of the digital camera 1 has 240×320 dots and that the screen of D10, D12 or D13 in which the whole screen of the personal computer is displayed, x and y will be allocated to x=320/800·X, y=240/600·Y, respectively.

After transforming the coordinate, in S135, the received data are allocated on the VRAM address (x, y) of the digital camera 1. Thus, the screen of the digital camera 1 coincides with the screen of the personal computer 1000. Further, in S135, only the data of the mouse cursor are formed by the digital camera 1 based on the position data received in S133 and updated on the allocated data.

If the event received in S132 is a warning, a warning screen D40 is displayed in S136.

Thus, the process in a case where an event occurs at the personal computer side terminates.

2. In a case where an event is occurred in the digital camera.

If an event occurs in the digital camera 1 by operating the switches of the digital camera 1 in S137, the content of the event and the coordinate (x, y) at which the event occurs are noticed to the personal computer 1000 in S138. In Step 1305, the personal computer 1000 receives the event and analyzes it to transform the coordinate into (X, Y) corresponding to the screen of the personal computer 1000. The transformation can be performed by calculating X=800/320·x and Y=600/240·y, each of which is a reversed operation expression of the above operation expression. Then, in S1307, the result of the event is displayed on the screen of the personal computer 1000 and the VRAM data of the personal computer 1000 is updated. In S1308, the VRAM data of the personal computer 1000 is transmitted to the digital camera 1.

On the other hand, in S139, the digital camera waits the updated VRAM data of the personal computer after notifying the personal computer 1000 of the occurrence of the event in S138. If the digital camera 1 received the data, in S140, a coordinate transformation which is similar to that in S134 is conducted and to allocate the data on the VRAM of the digital camera 1 in S141.

The reason why the event is notified to the personal computer 1000 to update the screen corresponding to the event at the personal computer side and then the updated screen is transmitted to the digital camera 1 again is as follows. If calculated based on the (x, y) system which is poor in screen resolution, and then the calculated data are corrected by the (X, Y) system, a computational error occurs, which causes a screen disorder of the personal computer 1000.

A method for registering an action to function keys will be explained with reference to FIG. 15. By simultaneously pressing both the function key F1 and the shutter button 9, the screen transits to D50, regardless that the digital camera 1 is connected or not connected to the personal computer 1000. In this embodiment, the currently registered action of the function key F1 is displayed as a boldfaced characters with an underline, and is changed to the next function in turn by pressing the UP key 6/the DOWN key 7. By pressing the shutter button 9, the changed result become effective and the screen returns to the original screen D50. By pressing the FL mode setting key 11, the changed results become invalid and the screen returns to D50. In this embodiment, examples of the action include "data transfer" in which the image data photographed by the digital camera 1 is transferred to the personal computer 1000, "specifying data transfer destination folder" which is used when transferring the image data photographed by the digital camera to the personal computer, "changing the screen magnification rate" by which the screen display magnification rate of the digital camera 1 is changed when the digital camera 1 is connected to the computer 1000, "turning off the power source of the personal computer", "displaying the image data in the personal computer", "executing an application in the personal computer" and "transferring the image data to the personal computer immediately after photographing". However, the present invention is not limited to the above.

The terms and sentences used in this specification are selected only for clear explanation of the present invention, and not limiting the present invention. There are many modifications and substitutions without departing from the spirit and scope of the present invention, which is defined by the appended claims.

What is claimed is:

1. A camera system, comprising:
    a camera for photographing an object and acquiring image data of the object;
    a computer connectable to said camera;
    a manipulation member provided to said camera and operative to input a command regarding control of a screen for display on a display of the camera;
    a camera controller provided to said camera for detecting an operation of said manipulation member and transmitting a signal representing the command input by the manipulation member to said computer; and
    a controller provided in said computer for controlling a screen of a display functioning together with said computer, based on the signal received from said camera.

2. The camera system according to claim 1, wherein the operation of said manipulation member is to specify a folder for transferring image data acquired by said camera to said computer.

3. The camera system according to claim 2, wherein said computer displays a warning screen on said display and transmits warning information to said camera when a capacity of the specified folder is not enough.

4. The camera system according to claim 3, wherein said camera is provided with an image display and displays a warning screen thereon based on the warning information, the warning screen being different from that on said display.

5. A camera system comprising:
    a camera for photographing an object and acquiring image data of the object;
    a computer connectable to said camera;
    an image display provided on said camera;
    a controller provided to said computer for detecting a connection of said camera to said computer and automatically transmitting display data stored in said computer to said camera based on the detected results; and
    a camera controller provided to said camera for controlling a screen of said image display based on the display data received from said computer while changing the number of pixels of the display data on the image display of the camera different from a display functioning together with said computer,
    wherein said camera controller changes the number of pixels of the display data by thinning out the display data based on the difference between the number of pixels of said image display and those of said display functioning together with said computer.

6. The camera system according to claim 5, wherein said displayed data includes mouse cursor display data, and wherein the mouse cursor display data are displayed on said image display without being thinned out.

7. The camera system according to claim 5, wherein said camera includes a manipulation member for instructing a change of display magnification rates of said image display, and wherein said camera controller changes the display magnification rate by changing a thinning out rate of the display data in response to an operation of said manipulation member.

8. The camera system according to claim 7, wherein said camera controller displays a frame showing a display range to be changed on said image display.

9. A camera system comprising:
a camera for photographing an object and acquiring image data of the object;
a computer connectable to said camera;
an image display provided on said camera;
a controller provided to said computer for detecting a connection of said camera to said computer and automatically transmitting display data stored in said computer to said camera based on the detected results; and
a camera controller provided to said camera for controlling a screen of said image display based on the display data received from said computer while changing the number of pixels of the display data on the image display of the camera different from a display functioning together with said computer,
wherein the display data include warning data.

10. The camera system according to claim 9, wherein said camera is able to transmit the image data to a folder specified in said computer, and wherein the warning data are data showing a lack of a capacity of the folder.

11. The camera system according to claim 9, wherein said image display displays a warning screen based on the warning data, the warning screen being different from a warning screen displayed on the display functioning together with said computer.

12. A camera, comprising:
a connector connectable to a computer;
an image display; and
a camera controller for receiving display data transmitted automatically from a computer when connected to said connector and controlling a screen of said image display based on the received display data while changing the numbers of pixels of the display data on the image display of the camera different from a display functioning together with said computer,
wherein said camera controller changes the number of pixels of the display data by thinning out the display data,
wherein said display data include mouse cursor display data, and wherein the mouse cursor display data are displayed on said image display without being thinned out.

13. A camera comprising:
a connector connectable to a computer;
an image display;
a camera controller for receiving display data transmitted automatically from a computer when connected to said connector and controlling a screen of said image display based on the received display data while changing the numbers of pixels of the display data on the image display of the camera different from a display functioning together with said computer, wherein said camera controller chances the number of pixels of the display data by thinning out the display data; and
a manipulation member for instructing a change of display magnification rates of said image display,
wherein said camera controller changes the display magnification rate by changing a thinning out rate of the display data in response to an operation of said manipulation member.

14. The camera according to claim 13, wherein said camera controller displays a frame showing a display range to be changed on said image display.

15. A camera system, comprising:
a camera for photographing an object and acquiring image data of the object;
a computer connectable to said camera, said computer including a manipulation device for activating an operation performed by the computer;
a memory provided in said camera, said memory registering an operation for said computer corresponding to the operation activated by said manipulation device; and
a manipulation member which calls a registered content from said memory and specifies the operation based on the registered content to activate the corresponding operation when said manipulation member is operated.

16. The camera system of claim 15, wherein said registered operation for said computer includes at least one of turning off the power source of the computer, executing an application of the computer, and displaying image data in the computer.

17. A camera system, comprising:
a camera for photographing an object and acquiring image data of the object;
a computer connectable to said camera;
a memory provided in said camera, said memory registering an operation which includes a transfer of the image data to said computer and display of dialog pertaining to the transfer on a display of the camera and a display functioning together with the computer; and
a manipulation member which calls a registered content from said memory and specifies the operation based on the registered content when said manipulation member is operated.

18. The camera system of claim 17, wherein said registered operation for said computer includes transfer of the image data to the computer immediately after photographing.

19. A camera, comprising:
a connector connectable to a computer, said computer operable by way of a manipulation device;
a memory for registering an operation for the computer corresponding to an operation activated by said manipulation device; and
a manipulation member which calls a registered content from said memory and specifies the operation based on the registered content to activate the corresponding operation when said manipulation member is operated.

20. The camera of claim 19, wherein said registered operation for said computer includes at least one of turning off the power source of the computer, executing an application of the computer, and displaying image data in the computer.

21. A camera, comprising:
a connector connectable to a computer;
a memory for registering an operation for the computer, operation including transfer of image data to the computer and synchronous display of dialog on a display of the camera and a display functioning together with the computer; and
a manipulation member which calls a registered content from said memory and specifies the operation based on the registered content when said manipulation member is operated when the connector connects the camera to the computer.

22. The camera of claim 21, wherein said registered operation for said computer includes transfer of the image data to the computer immediately after photographing.

* * * * *